Aug. 29, 1967  W. A. EWERS, JR., ET AL  3,339,011
PNEUMATICALLY SEALABLE ENCLOSURE FOR ELECTRICAL CONDUIT SPLICES
Filed Feb. 19, 1965
2 Sheets-Sheet 1

INVENTORS
WILLIAM A. EWERS, JR.
AND RUSSELL R. EARLY
BY
*Jerome A. Gross*
ATTORNEY Aug. 29, 1967 W. A. EWERS, JR., ETAL 3,339,011
PNEUMATICALLY SEALABLE ENCLOSURE FOR ELECTRICAL CONDUIT SPLICES
Filed Feb. 19, 1965
2 Sheets-Sheet 2

INVENTORS
WILLIAM A. EWERS, JR.
AND RUSSELL R. EARLY
BY
ATTORNEY

United States Patent Office 3,339,011
Patented Aug. 29, 1967

3,339,011
PNEUMATICALLY SEALABLE ENCLOSURE FOR ELECTRICAL CONDUIT SPLICES
William A. Ewers, Jr., 9710 Traverse Lane, Edmundson, Mo. 63134, and Russell R. Early, 1512 E. Swan Circle, Brentwood, Mo. 63144
Filed Feb. 19, 1965, Ser. No. 434,026
4 Claims. (Cl. 174—92)

The present invention relates generally to a protective enclosure for conduits and the like, and more particularly to a pneumatically sealable cover for receiving splices of electrical cables, wherein exposure of the ends to the atmosphere, and especially moisture, is to be avoided.

Where polyethylene and lead cables, of the type which carry electrical conductors for power and communication transmission, have been opened for splicing or like operations, it is often necessary either to complete the operation through continuous work or to temporarily wrap the cables with a rubberized stretch tape. For various reasons, it is not feasible to work continuously on certain splicing operations. Furthermore, such wrapping tape deteriorates rapidly, is not easily or quickly applied, and often results in unacceptable wrinkles. The present invention overcomes these problems and, in addition, provides a facile test to insure that the cables are sealedly enclosed.

Among the objects of the present invention are the provisions of a unique enclosure for receiving the ends of electrical cables and the like; wherein:

The enclosure may be readily and quickly applied to the cables subsequent to a partially or completely performed splicing operation;

The cables are received in an air-tight enclosure regardless of irregularities along the outer surface of the cables; and A standardized enclosure is adaptable to sealedly accommodate varying numbers, combinations, and sizes of cables.

These objects (as well as others apparent herein) are achieved generally by providing an enclosure including a longitudinally-split sealable casing. At each end of the sealable casing there is provided a pair of parallel and spaced-apart panels which form the end walls of the casing. Each pair of panels include aligned openings through which the conduits pass into the sealable casing. Resilient means, such as inflatable seals of the special designs shown, are confined between the panels of each end wall, and by such confinement, they are directed against the conduits passing through the openings in the end walls of said casing. Provision is made for the inflation of such seals and the pressure-testing of the interior of the casing.

Utilization of the present invention will become apparent to those skilled in the art from the disclosures made in the following description of a preferred embodiment of the invention as illustrated in the accompanying drawings, in which.

Figure 1:
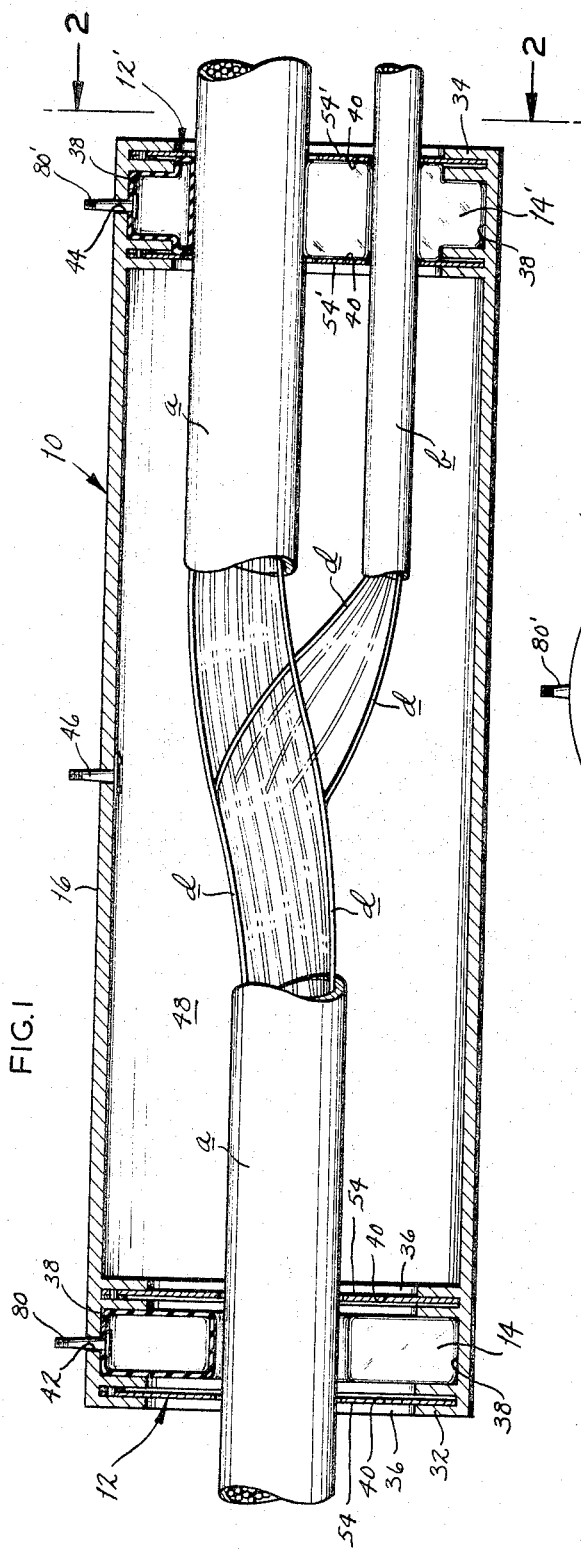
FIG. 1 is a cross-sectional view showing a principal sheathed cable received within and passing through the pneumatic enclosure of the present invention and a supplementary cable entering the right end wall thereof and spliced to the principal cable therein. The left end wall seal is shown deflated, and the right end wall seal inflated.

Referring now to the drawings, wherein like reference characters designate like or corresponding parts throughout the several views, there is shown in FIG. 1 a protective enclosure, generally designated 10, having a large diameter main cable $a$ entering through its left end walls 12 and leaving through the right end wall 12′. In addition a smaller diameter supplemental cable $b$ has an end passed through the right end wall 12′ into the enclosure 10. Electrical conductors or wires $d$ are carried by the cables $a$ and $b$. In a typical splicing operation the cables $a$ and $b$ are opened so that the electrical conductors $d$ may be electrically connected. It is for the purpose of temporarily sealing these opened cables $a$ and $b$ and exposed conductors $d$ that pneumatic seals 14 and 14′, to be described hereinafter, are provided at the end walls 12 and 12′.

*Sealable casing*

Figure 2:
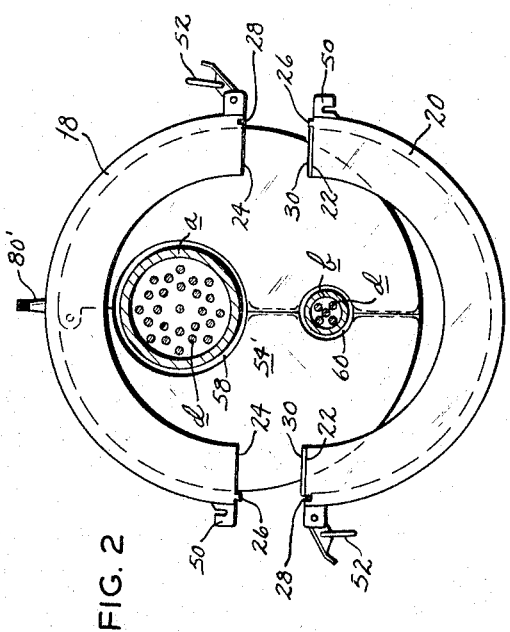
FIG. 2 is an exploded end view of the enclosure taken along line 2—2 of FIG. 1.

The protective enclosure 10 takes the form of a longitudinally-extending, generally cylindrical casing 16. Preferably the casing 16 is a cast aluminum two-piece member, split longitudinally into an upper semi-cylindrical part 18 and a lower semi-cylindrical part 20. As may best be seen in FIG. 2, the upper and lower parts 18, 20 mate along longitudinal edges 22 and 24. One of the longitudinal edges of each semi-cylindrical part 18, 20 is provided with a protruding lip 26, and the other diametrically opposed longitudinal edge is provided with a sealing groove 28. The upper and lower semi-cylindrical parts 18 and 20 are fitted together by placing sealing gaskets 30 between their longitudinal mating edges 22, 24 and fitting the protruding lips 26 of each part into the corresponding sealing groove 28 of the other part.

The diameter of the casing 16 may vary depending upon the particular splicing application; but it is preferably ample, so that each casing serves as a standardized enclosure for accommodating a number of combinations of different size cables through its ends 32, 34. As will be apparent from the following description of the casing end walls 12, 12′, the openings through which the cables are to be passed may be readily varied to accommodate such various cable sizes and combinations.

Adjacent to the ends 32, 34 of each semi-cylindrical part 18, 20, there is provided a pair of internal ribs 36. Each rib 36 is parallel to the other and spaced apart to provide an arcuate recess 38 therebetween. When the upper and lower semi-cylindrical parts 18, 20 are fitted together along their longitudinal edges 22, 24, the two pairs of ribs 36 and arcuate grooves 40 of the upper part 18 register with the two pairs of ribs 36 and their respective grooves 40 of the mating lower part 20. Furthermore, when the upper and lower parts 18 and 20 are so registered, the arcuate recesses 38 form generally annular cavities for receiving portions of the pneumatic seals 14 and 14′, to be described.

The upper semi-cylindrical part 18 is provided with two gas valve openings 42 and 44, which communicate between the arcuate recesses 38 of the upper part 18 and the outside of the casing 10. A conventional gas-tight pressurizing valve 46 is provided integrally with the upper semi-cylindrical part 18 between its two pairs of internal ribs 36. By means of the valve 46, air or other suitable gas may be introduced into the interior chamber 48 of the casing 16.

In order to secure the upper and lower semi-cylindrical parts 18, 20 together, four sets of conventional fastening hooks 50 and cammed latches 52 are provided along the outer surface of the casing 10 adjacent to the sealable edges 22, 24 of the parts 18, 20. The latches 52 may be loosened and fitted over the fastening hooks 50; after hooking the latches 52, they may be drawn taunt so that the gaskets 30 seal the casing 10 along the mating edges 22, 24.

Casing end walls

The removable walls 12 and 12' are provided at the ends 32, 34 of the casing 16. In the embodiment illustrated, these walls 12, 12' consist of two parallel spaced panels 54 at the end 32 and two similarly spaced panels 54' at the end 34. These panels 54, 54' are fitted within the four arcuate grooves 40 of the four pairs of internal ribs 36 when the upper and lower casing parts 18, 20 are secured together. Preferably the panels 54, 54' are stamped from sheets of steel and are characterized by their strength in resisting pressure at their inner portions while supported within the grooves 40 at their peripheral portions only.

As may be best seen in FIG. 1, the two pairs of panels 54, 54' have aligned openings for receiving the cables $a$ and $b$. The panels 54 each have present a single opening 56, aligned with the opening of the other; while the panels 54' have two sets of aligned openings 58, 60. The outside diameters of all of the panels 54, 54' are made to standard size so that they may be interchangeably fitted into the arcuate grooves 40 of the casing parts 18, 20. For each casing 16, a plurality of panels is provided, each panel having different combinations and sizes of openings. In this manner, sets of end wall panels 54, 54', and variations thereof, may be interchanged for use with the standardized casing 16 for accommodating different combinations and sizes of cables.

Figure 3:
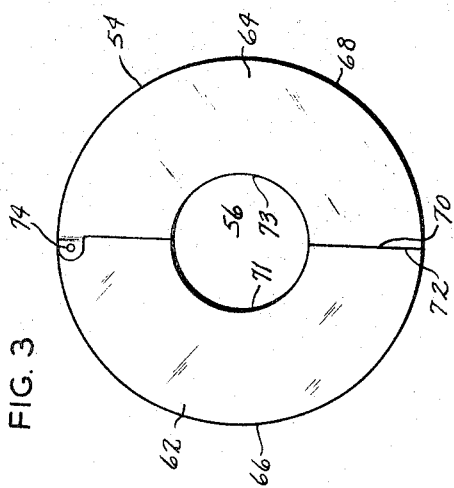
FIG. 3 is a detailed view of the left end wall panel used with the instant enclosure.

Referring to FIG. 3, there is shown a left end panel 54 having a circular opening 56. The panel 54 consists of two semi-circular disc-like portions 62, 64 including rounded outer edges 66 and 68 and inner edges 70, 72, which have semi-circular notches or cut-outs 71 and 73, respectively presented opposite each other. The two disc-like portions 62, 64 are pivotally pinned at an overlap joint 74 adjacent to their inner edges 70, 72 and toward one end thereof. When the disc-like portions 62, 64 are pivoted to their closed position, the semi-circular notches or cut-outs 71, 73 are presented together to form the circular end wall opening 56 for the cable $a$. It should be noted that this two-piece construction of the panels 54 allows them to be opened and closed for ready placement about and removal from the cable $a$.

Figure 4:
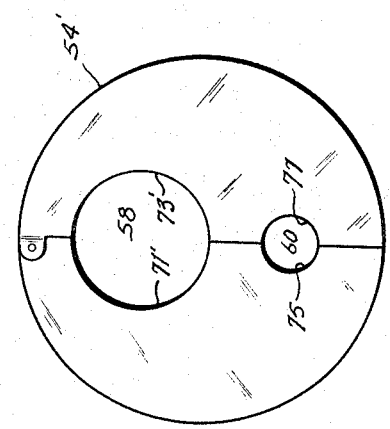
FIG. 4 is a detailed view of the right end wall panel used with the enclosure.

Referring to FIG. 4, there is shown one of the pair of right end panels 54'. This panel resembles panel 54 in its pinned two-piece design. However, in addition to the larger cut-outs 71', 73' which together form the opening 58 for the cable $a$, two cut-outs 75 and 77 outward of cut-outs 71' and 73' respectively together form a second opening 60 for the supplemental cable $b$. The panel 54' may be readily opened and closed to accommodate the two cables $b$ and $c$ in the manner shown in FIG. 1.

Inflatable pneumatic seals

Figure 5:
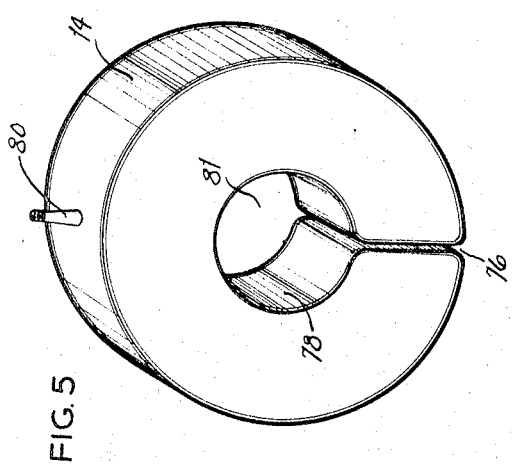
FIG. 5 is a detailed perspective view of the left end inflatable seal, used within a pair of the wall panels of FIG. 3.
Figure 6:
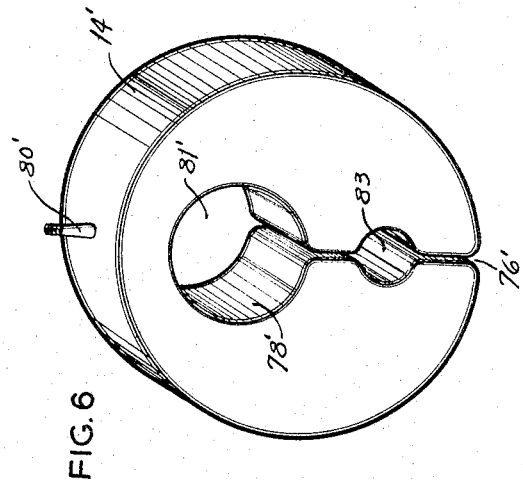
FIG. 6 is a detailed perspective view of the right end inflatable seal used within a pair of wall panels of FIG. 4.

Two resilient, pneumatic seals 14 and 14' are provided at ends 32, 34 of the casing 16 and within the registered arcuate recesses 38. Preferably the inflatable seals 14 and 14' are formed by molding rubber into hollow, almost doughnut-like annular members which are split by walled slots 76 and 76', respectively (see FIGS. 5 and 6). These slots 76, 76' extend outward from inner circular walls 78, 78', which are formed so as to provide openings 81, 81' in alignment with openings 56 and 60 of the wall panels 54, 54' between which the respective seal members 14, 14' are confined. Thus, the inflatable seal 14 presents a single opening 81 which is centered with the openings 56 of the end wall panels 54. The inflatable seal 14' in addition to a larger opening 81', has a smaller opening 83 along the slot 76', aligned with the smaller openings 60 of the end wall panels 54' when inserted therebetween.

The slots 76 and 76' of the seal members 14 and 14' allow them to be opened in the same manner as are the end wall panels 54, 54', so that they may be placed about the cables $a$ and $b$. Gas valve inlets 80 and 80' are formed integrally with the expandable seal members 14 and 14'. When the inflatable seal members 14 and 14' are positioned between their end wall panels 54 and 54' and covered by the semi-cylindrical parts 18, 20 of the casing 16, these gas inlet valves 80, 80' protrude outward through the valve openings 42 and 44 of the casing 16.

Operation

After splicing the electrical conductors $d$, the deflated seal member 14 is opened along its slot 76 and placed about the cable $a$ to the left side of the splice as viewed in FIG. 1. When the seal member 14 is so positioned, the cable passes through the openings 81 provided by the inner cylindrical wall 78. Similarly the deflated seal member 14' is opened along its slot 76' and placed about the cable $a$ to the right side of the splice as viewed in FIG. 1. Next, the end wall panels 54 and 54' are opened along their inner edges 70, 70', 72, 72' and similarly placed about the cables $a$ and $b$ with the seal member 14 confined between the two end wall panels 54 and the seal member 14' confined between the two end wall panels 54'.

After the inflatable seals 14 and 14' and end wall panels 54 and 54' have been placed on the cables $a$ and $b$, the upper and lower parts 18 and 20 of the casing 16 are placed around the spliced cables with the outer peripheral portions of the panels 54 and 54' fitted within the outer peripheral portions of the panels 54 and 54' fitted arcuate grooves 40 of the internal rims 36. In this manner of fit the inflatable seals 14 and 14' are confined within the annular recess 38 between the end wall panels 54 and 54'.

After the parts are secured together by means of the fastening hooks 50 and latches 52, the seals 14 and 14' may be inflated by introducing air or another suitable gas into them through the gas valve inlets 80 and 80'. The seals 14 and 14' expand resiliently outward into full engagement with the cables $a$ and $b$ to seal along those portions of the sheaths of the cables received between the pairs of end walls panels 54 and 54'. Thus, the interior chamber 48 of the casing 16 is effectively sealed off from moisture and the like, even though the cables are irregular and somewhat out-of-round.

In order to test the effectiveness of the seals, air or suitable gas may be introduced into the interior chamber 48 by means of the gas valve 46 to pressurize the casing 16. Loss of pressure from the casing 16, which may be conventionally detected at gas valve 46, will indicate a faulty seal, if one should develop. This testing procedure assures that the engagement between the inflatable seal members 14 and 14' of the cables $a$ and $b$ is holding and affording acceptable seals.

Obviously, many modifications and variations of the present invention are possible from the above teachings. It is therefore to be understood that, within the scope of the appended claims, the invention may be practiced otherwise than as specifically described.

We claim:
1. A pneumatically sealed enclosure for receiving the ends of electrical conduits and the like, comprising
    a longitudinally-split sealable cylindrical casing having means within and adjacent to each of its longitudinal ends to retain and space apart a pair of end wall panels each end wall panel including two semi-circular disc portions having rounded outer edges and inner edges including aligned cut-outs therealong, whereby such conduits may enter said casing through said aligned cut-outs, and
    inflatable seal means confined between each of said pairs of panels of said end walls and having openings aligned with said panel openings, said inflatable means being expandable, when so confined, against such conduits passed through said end wall openings, characterized in that
        said end walls are removable from the said means to retain them, and said semi-circular disc portions are pivotally pinned to each other with their cut-outs presented together to form said openings of said panels, whereby said semi-circular disc portions may be pivotally opened apart for placement about said conduits.

2. The pneumatically sealed enclosure as defined in claim 1, wherein said semi-circular disc portions are characterized by such strength that with their outer edges received in said means to retain, they resist the pressure of said inflated seal means confined therebetween.

3. A pneumatically sealed enclosure for securing the ends of electrical conduits for splicing and the like, comprising an open-ended casing split longitudinally into two parts, each part having longitudinally-extending seal means along the longitudinal edges of each part, fastening means for securing said split casing parts together, said casing having adjacent to each of its ends a pair of internal ribs spaced from each other and having a groove therein, said casing further having gas valve openings between each pair of said grooved ribs, two pairs of two-piece end wall panels, each panel fitted in a groove of said internal rib pairs, each panel including an opening sufficient to accommodate a conduit to be received in said casing, and inflatable pneumatic seal members confined between each pair of said end wall panels, said pneumatic seal members further having air valves extending through said air valve openings of said casing, whereby said pneumatic seal members may be inflated and thus expanded sealedly against such conduits.

4. A pneumatically sealed protective enclosure for receiving the ends of electrical conduits for splicing and the like, comprising a longitudinally-split sealable casing, parallel spaced-apart pairs of panels forming walls at each end of said casing and including aligned openings therethrough, there being two sets of said aligned openings through that pair of panels at one end of said casing, pneumatic seal members, each being in the form of an annulus split by a slot extending outward from an inner circular wall, confined between each of said pairs of panels of said end walls and having openings aligned with said panel openings, said seal members being expandable, when so confined, against such conduits pased through said end wall openings, and means communicating with each said seal member to expand it sealedly around such conduits, that pneumatic seal member which is confined between that pair of panels which has two sets of aligned openings, having semi-circular cut-out portions oppositely disposed to each other along said slot and in alignment with one of said sets of wall openings, whereby said pair of panels may sealedly accommodate two of such conduits therethrough.

References Cited

UNITED STATES PATENTS

| | | | |
|---|---|---|---|
| 2,621,228 | 12/1952 | Tompers | 174—77 X |
| 2,740,825 | 4/1956 | Rifenburg | 174—22 X |
| 2,822,192 | 2/1958 | Beatty | 277—34 X |
| 3,038,732 | 9/1962 | Scott et al. | 271—34 |
| 3,061,666 | 10/1962 | Duvall et al. | 174—92 |
| 3,148,241 | 9/1964 | Moore | 174—92 |
| 2,175,032 | 3/1965 | Strauss | 174—93 |

DARRELL L. CLAY, *Primary Examiner.*